Oct. 7, 1952   A. W. GRANT   2,613,178
METHOD OF ELECTROFORMING SEAMLESS TUBES
Filed Jan. 19, 1946
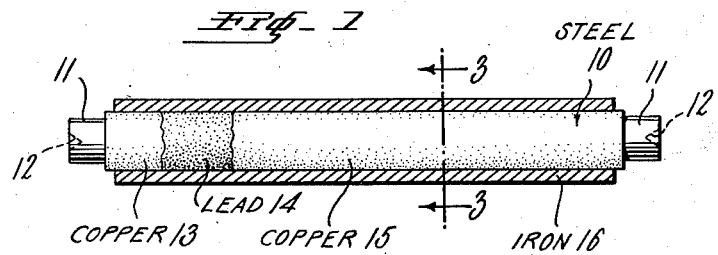
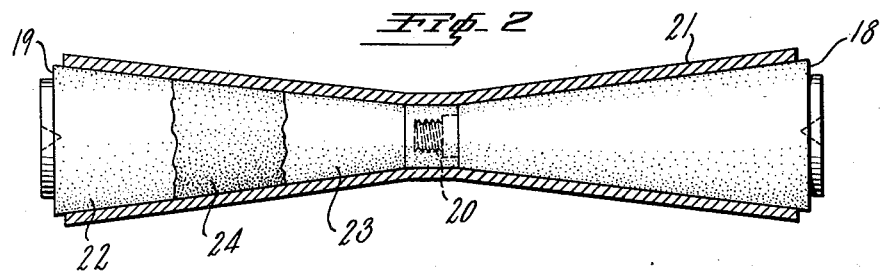
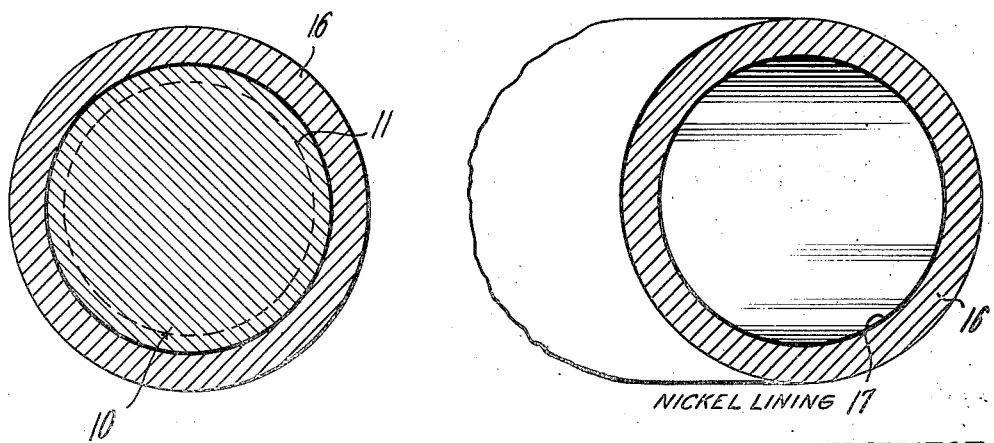
INVENTOR
ARTHUR W. GRANT
BY
Charles C. Willson
ATTORNEY Patented Oct. 7, 1952

2,613,178

UNITED STATES PATENT OFFICE 2,613,178

METHOD OF ELECTROFORMING SEAMLESS TUBES

Arthur W. Grant, Detroit, Mich., assignor to United States Rubber Company, New York, N. Y., a corporation of New Jersey Application January 19, 1946, Serial No. 642,233

3 Claims. (Cl. 204—9)

This invention relates to a novel method for making iron or other seamless metal tubes so that they will have a smooth and highly accurate internal bore.

Seamless metal tubes have been made for many years by working the metal while hot, but the methods employed heretofore for making seamless iron tubes or pipes have caused the inner walls thereof to be relatively rough.

It has been possible heretofore to make precision metal tubes having close internal tolerances and high finish by employing such operations as grinding, broaching or reaming, but these operations are expensive and it is extremely difficult to grind the bore of a small tube that is more than a few inches long, and while broaching can be used more or less satisfactorily to give the bore of a straight tube the desired size and shape, broaching cannot be used for a tapered tube.

Having in mind the foregoing the present invention contemplates the manufacture of seamless tubes by electro-depositing the tube forming metal such as iron, in the manner hereinafter described, upon a metal form or mandrel the outer surface of which has been accurately ground to the desired size, and after the tube has been electrodeposited and machined to the desired wall thickness it is removed from the form by drawing end-wise off of the form.

It has been proposed heretofore to make seamless tubes by electrodepositing iron on a metal mandrel, such as stainless steel, and then strip such tube off of the mandrel, but if the mandrel was of uniform diameter throughout its length and was more than several inches long it was found extremely difficult to remove the tube from the mandrel without scoring the inner walls of the tube or otherwise damaging the same.

The present invention contemplates a novel method whereby electrodeposited tubes a foot or more in length may be formed upon an accurately finished mandrel and then removed from the mandrel without scoring or otherwise damaging the bore of such tube or the surface of the mandrel.

The method of the present invention may be employed in making tubes, the inner bore of which may be round, square, tapered or otherwise shaped, so long as it is possible to pull the snug fitting tube in a lengthwise direction off of the form or mandrel, and thereby permit the same mandrel to be used over and over in making such seamless tubes. The method of the present invention may be employed to make seamless tubes of various metals, but has been developed more particularly for making strong durable iron tubes having very smooth and accurately sized internal bores.

In carrying out the present method an electrodeposited film of lead is provided between the mandrel and the electrodeposited tube of iron or other metal, so that the tube can be removed from the mandrel by applying sufficient heat to melt the lead, whereupon it will act as a lubricant and permit the tube to be stripped off of the mandrel without scoring or otherwise injuring its internal walls. It is desirable however to provide the mandrel with a protecting film before the lead is electrodeposited thereon, and to provide a similar film over the lead coating.

Therefore the steel mandrel, in accordance with the present invention, is provided with an electrodeposited flash film of copper, over which is electrodeposited the film of lead, and over this film of lead is electrodeposited a second flash film of copper. The film of copper applied to the mandrel affords some mechanical protection and some protection from the electrolyte bath used to deposit the lead. The flash film of copper applied over the lead provided a better surface to receive the subsequently deposited film of nickel, silver, chromium or iron. As a result of this method the mandrel when removed from the electrodeposited tube may be chemically treated to remove the flash film of copper deposited thereon so as to restore the mandrel to its original condition ready for use in repeating the process.

In many cases it may be desirable to provide the electrodeposited iron tube that is produced in accordance with the present invention with a non-corroding metal lining such as nickel, silver, or chromium. This is readily accomplished by electrodepositing such non-corroding metal directly over the abovementioned second flash film of copper and electrodepositing the iron tube upon this film of non-corroding metal.

The above and other features of the present invention will be more fully understood from the following description when read in connection with the accompanying drawing showing electrodeposited tubes formed in accordance with the present method.

In the drawing:

Fig. 1 is a longitudinal side view of a mandrel of uniform diameter having electrodeposited thereon a metal tube, shown in section, that is is formed in accordance with the present method.

Fig. 2 is a similar view showing two tapered mandrels secured together and having formed thereon, as shown in section, a tube that is electrodeposited in accordance with the present invention.

Fig. 3 is an enlarged sectional view taken on the line 3—3 of Fig. 1; and

Fig. 4 is a perspective sectional view of a nickel lined tube after it has been removed from its forming mandrel.

In carrying out the present invention a carefully made mandrel or form is required and the same is preferably made of steel which is accurately ground to the desired size. Such mandrel or form may, as above stated, be given numerous different shapes so long as it is possible to remove the mandrel either as a whole or as disconnected parts from the electrodeposited tube without injuring the mandrel or tube.

In Fig. 1 of the drawing there is shown a steel mandrel 10 of uniform diameter throughout the greater portion of its length and which may be hardened and ground accurately to the desired size. This mandrel has the usual reduced ends 11 and lathe centers 12 adapted to support the mandrel on the centers of a lathe or grinder.

With the mandrel 10 at hand the steps followed in carrying out the method of the present invention are the following. The mandrel is carefully cleaned in the regular manner for preparation for electroplating in accordance with conventional practice. Then there is electrodeposited on this mandrel a flash film 13 of copper, and by flash film is meant a film that is so thin that it can hardly be measured, such a film may have a thickness of .00001" or .00002". Over this flash film 13 of copper is deposited a film 14 of pure lead having the thickness of the order of .0005" to .001", and the outer surface of this lead film 14 is preferably polished. Over this film of lead is deposited a second flash film 15 of copper, and over this film of copper is electrodeposited the jacket 16 of a strong durable metal such as iron.

This completes the method of making the seamless tube contemplated by the present invention, except for the step of removing the tube 16 from the mandrel 10. In some cases however it may be desirable to increase the smoothness and accuracy of the outer surface of the tube 16, and this may be done by placing the mandrel 10 in a lathe or grinder on the same centers 12 and turning down the outer face of the tube 16 to the desired size and shape. The advantage of this is that the outer surface of the tube is turned down while using the centers 12 upon which the mandrel was supported when its outer surface was finished. This insures that the outer surface of the tube will be accurately centered with respect to the inner surface of the tube engaging the mandrel.

When the tube 16 is to be removed from the mandrel the parts are heated sufficiently to melt the lead film 14, whereupon this lead will act as a lubricant and facilitate the drawing of the tube off of the mandrel. Finally, the inside of the tube 16 may be polished by forcing a soft cloth therethrough to remove stains. The films 13 and 15 of copper prevent the lead film 14 from engaging the steel mandrel 10 or tube 16 while the lead is in a melted condition. While tin melts at a lower temperature than lead it cannot be used satisfactorily in place of the lead film 14 because tin does not act as a lubricant as does melted lead, with the result that if tin should be used in place of lead, the tube 16 would be hard to strip from the mandrel and scoring of the inside of the tube would probably result during the stripping operation.

After a mandrel is removed from the tube electrodeposited thereon it may be rendered free of the flash coating of copper and traces of lead by immersing in a bath containing a mixture of perchloric acid and hydrogen peroxide or similar baths known to the art.

In many cases it may be desirable to provide an electrodeposited tube such as contemplated by the present invention with a non-oxidizing protecting film of nickel, silver or the like on its inner face. Such a construction is shown in Fig. 4 wherein the iron tube 16 has its inner face lined with nickel 17. This nickel was deposited upon the copper 15.

Fig. 2 illustrates a modified type of mandrel consisting of the tapered members 18 and 19 one of which has a threaded socket at its smaller end and the other has the pilot portion and threaded extension 20 at its smaller end. The construction is such that these two members 18 and 19 may be secured rigidly together, whereupon the electrodeposited sleeve 21 may be formed thereupon as above described, then sections 18 and 19 may be unscrewed under the influence of heat, one from the other so that they can be withdrawn from the tube 21. This mandrel 18, 19, like the mandrel 10, is provided with the flash films 22 and 23 of copper and the film 24 of lead.

Precision tubes made in accordance with the present invention so that they have smooth accurately sized bores may be used for a number of purposes, for example: they may be used in microscopes, and field glasses; as accurate venturi tubes or nozzles; as wave meter bodies for use in radar work, and in other fields where extreme accuracy of dimensions and high internal finish or mirror finish are desired.

Having thus described my invention what I claim and desire to protect by Letters Patent is:

1. The method of making upon the same form successive tubular objects of iron having a smooth accurately sized inner surface, which comprises providing a steel form having a smooth accurately formed outer surface, electrodepositing a thin barrier in the form of a flash film of copper over the form, electrodepositing a film of lead approximately .001 inch thick over the copper, electrodepositing a second flash film of copper of similar thickness to the first as a barrier over the lead, electrodepositing a seamless iron jacket of substantial thickness over said second flash film so that the bore of this jacket will conform within approximately .001 of an inch to the size of the corresponding portion of said form, and then melting the lead film and drawing the iron jacket off the form while the lead is prevented by the barriers from contacting the metal of the form or jacket.

2. The method of making a seamless tubular metal object having a smooth accurate non-oxidizing inner surface, which comprises providing a steel form having a smooth accurately formed outer surface, electrodepositing a thin barrier in the form of a flash film of copper over the form, electrodepositing a film of lead over this film of copper, electrodepositing a second flash film of copper of similar thickness to the first over the lead, electrodepositing a protecting film of non-oxidizing metal selected from the group consisting of chromium, nickel and silver over the second film of copper, electrodepositing a seamless iron jacket over said protecting film, then melting the lead film and drawing the iron jacket lined with the protecting film off of the form, and removing the second flash film of copper.

3. The method of making a seamless tubular metal object having a smooth accurate nonoxidizing inner surface, which comprises providing a steel form having a smooth accurately formed outer surface, electrodepositing a thin barrier in the form of a flash film of copper over the form, electrodepositing a film of lead over this film of copper, electrodepositing a second flash film of copper of similar thickness to the first over the lead, electrodepositing a protective film of chromium over the second film of copper, electrodepositing a seamless iron jacket over said protecting film and then melting the lead film and drawing the iron jacket lined with the protecting film off of the form.

ARTHUR W. GRANT.

REFERENCES CITED

The following references are of record in the file of this patent:

UNITED STATES PATENTS

| Number | Name | Date |
|---|---|---|
| 602,212 | Dessole | Apr. 12, 1898 |
| 850,912 | Edison | Apr. 23, 1907 |
| 1,412,174 | Eustis et al. | Apr. 11, 1922 |
| 1,566,984 | Shoemaker | Dec. 22, 1925 |

FOREIGN PATENTS

| Number | Country | Date |
|---|---|---|
| 12,264 | Great Britain | of 1888 |
| 230,456 | Great Britain | June 3, 1926 |
| 239,977 | Great Britain | Sept. 24, 1925 |